United States Patent

[11] 3,574,941

[72] Inventor Theo Ritter
9 Avenue Ruchonnet 1000, Lausanne, Vaud, Switzerland
[21] Appl. No. 851,364
[22] Filed Aug. 19, 1969
Continuation-in-part of Ser. No. 582,684, Sept. 28, 1966
[45] Patented Apr. 13, 1971
[32] Priority Oct. 6, 1965
[33] Switzerland
[31] 13,852/65

[54] DEVICE FOR STRAIGHTENING TEETH AND METHOD OF MAKING SAME
8 Claims, 11 Drawing Figs.

[52] U.S. Cl. ................................................... 32/14
[51] Int. Cl. ................................................... A61c 7/00
[50] Field of Search ........................................ 32/14

[56] References Cited
UNITED STATES PATENTS
360,695 4/1887 Holmes ........................ 32/14

FOREIGN PATENTS
128,350 2/1902 Germany ..................... 32/14

Primary Examiner—Robert Peshock
Attorneys—Emory L. Groff and Emory L. Groff, Jr.

ABSTRACT: An orthodontic device for straightening teeth includes a plate which partially surrounds the patient's teeth and has embedded therein an internally threaded nut or housing adjacent the tooth to be straightened. The housing provides an anchoring point for a capless pressure screw which may be solid or hollow. The hollow-type of screw contains a spring normally urging a piston against the tooth to be straightened to provide a constant pressure on the tooth to move it into proper position in relation to other teeth in the patient's mouth. The degree of pressure applied to the tooth may be adjusted from time to time by appropriate rotation of the screw. An orthodontic device of the aforementioned nature may be made by a flasking method which includes baking, or by a spray on cold cure method. Both methods utilize a plaster model of the patient's teeth to which a wax or resin is applied to form the plate.

Patented April 13, 1971 3,574,941

INVENTOR
THEO RITTER

BY *Emory L. Groff Jr*

ATTORNEY

DEVICE FOR STRAIGHTENING TEETH AND METHOD OF MAKING SAME

This invention relates to an orthodontic device or appliance for straightening one or more teeth which are to be moved so as to place them in proper position relative to other teeth, and methods of making such an appliance. More particularly, the appliance comprises a plate of dental wax or synthetic resin material formed by applying such material to a plaster model of a person's teeth, the model having been made from an impression of the teeth as is customary practice. Embedded in the material are one or more tubular, internally threaded nuts or housings positioned adjacent to and at the desired angle to a particular tooth before the plate material is applied to the mold. The housing is initially positioned relative to the tooth to be straightened by inserting a temporary positioning screw into the housing and screwing it in so that it protrudes approximately 0.5 mm. from the end of the housing facing the tooth to be straightened. Next, the protruding end of the screw is positioned against the tooth by supporting it in wax on the side of the tooth or by drilling a small hole in the tooth and screwing the end of the screw into the hole. After the plate material has been applied to the model and the housing and screw are embedded in the material as previously described, the plate material is cured and the positioning screw is removed leaving the housing as an integral part of the synthetic resin plate.

The threads of the housing are then cleaned with a special reaming tool and a headless or capless pressure screw, normally of less length than the positioning screw, is inserted into the housing. When the plate is placed in the patient's mouth, the pressure exerted on the particular tooth by the end of the screw adjacent thereto may be controlled by appropriate rotation of the screw. The pressure screw may be solid or hollow. A hollow-type screw is provided with a piston normally spring urged outwardly.

In instances where two or more housings and screws are used in the plate, the plate may be retained in the patient's mouth just by the pressure of substantially oppositely disposed screws combined with the close contour fitting of the plate relative to the shape of the teeth and adjacent portions of the patient's jaw. If the plate cannot conveniently and comfortably be retained in the aforesaid manner, conventional spring wire retainer members may be used. In either case, the capless pressure screw is of such a length that it will not normally extend beyond the inner surface of the plate, that is the surface away from the teeth and thus will obviate discomfort to the patient since the screw and related parts, i.e. spring and piston, do not come into contact with the patient's tongue. Screws of different lengths may be used as the particular circumstances require. However, the length should not be so great that it would extend beyond the inner surface of the plate for the reason previously set forth.

Accordingly, the present invention has for one of its objects the production of a dental straightener, which will permit application of progressive pressure on an individual tooth to be straightened by means of a capless pressure screw, engaged in a nut or housing embedded in a wax or synthetic resin plate at least partially surrounding said tooth.

Another object of the invention is to provide a pressure screw for use with the dental straightener of my invention, said screw being hollow and housing a spring loaded piston.

Another object of the invention is to provide a practical, efficient and inexpensive method of making the aforementioned dental straightener.

The accompanying drawing shows by way of example, two embodiments of the device according to the invention, wherein:

FIG. 1 an elevation of a positioning or retaining screw of a first embodiment, the screw being engaged in a nut.

Figure 1:
Figure 2:
FIG. 2 is a plan view of FIG. 1.

The straightening device, in the first embodiment shown in FIG. 1 to 6, comprises for each tooth to be straightened a positioning or mounting screw 1 of the milled cap type (FIGS. 1 and 2), made for example of brass, and being approximately 1.7 mm. in diameter and 10 to 12 mm. in length. The screw 1 is engaged in a knurled nut 2, made for example of German silver and provided with a tip 3 of truncated shape.

The nut 2 is embedded in the straightening device and positioned relative to a particular tooth 4 in different ways depending upon the particular method used in forming the device, namely a flasking method, or a spray on method. The first step before practicing either method is to make an impression of the patient's teeth and then reproduce the position and shape of the teeth in a plaster model which procedure is well known in the art. In the flasking method, dental wax 5 is applied around the inner surface of all of the teeth in the model up to the desired height. The wax is then partially cut away from around the tooth or teeth to be moved and the positioning screw 1 and nut 2 are placed in the remaining wax in proper position with the end of the screw extending approximately 0.5 mm. beyond the end of the nut facing the tooth. The tip of the screw must touch the tooth so as to properly space the nut the desired distance from the surface of the tooth. The nut and screw are covered with wax and the model is then placed in a flask, packed and baked. After so processing, the model is removed, and the positioning screw 1 is removed leaving the nut 2 embedded in the finished device.

In the spray on method, the positioning screw and nut, assembled as previously mentioned, are supported relative to the plaster model of the tooth to be moved by either placing a small portion of wax on the tooth and placing the end of the screw therein, or by drilling a small hole in the tooth and screwing the screw 1 into the hole. The model is soaked in water for approximately 10 minutes to eliminate all air and then after removal from the water, a separating preparation is applied to facilitate separation of the appliance to be formed from the model. A cold cure acrylic resin and liquid are applied to the model so as to partially surround the teeth and embed the nut or nuts in the resinous material. After curing, the positioning screws 1 are removed and the appliance is separated from the model. The knurled surface of the nut 2 tends to firmly anchor it in the appliance material.

In both methods, the threads of the nut are cleaned with a reaming tool and a capless pressure screw 6 (FIGS. 4 and 5), preferably of stainless steel is inserted in the nut 2. The screw, whose diameter is approximately 1.7 mm., is designed for straightening the tooth 4 (FIG. 6) and its length is variable depending upon the particular case to be treated.

In certain applications, the knurled nut 2 may be replaced by a smooth nut, welded to a labial arch or to a spring wire which applications will be hereafter described.

Figure 7:
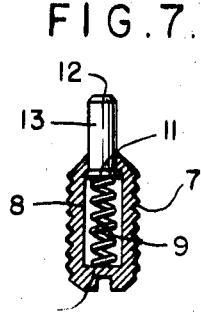
FIG. 7 is an elevation, partly in cross section along line VII—VII of FIG. 8 and on a larger scale of a spring loaded piston screw according to a second embodiment.
Figure 8:
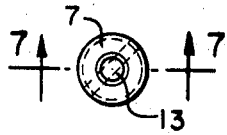
FIG. 8 is a plan view of FIG. 7.
Figure 9:
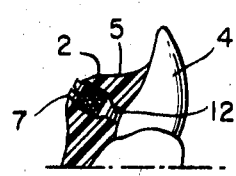
FIG. 9 is an elevation partly in section, of a tooth to be straightened to which is applied the spring loaded piston screw shown in FIG. 7.

The ultimate objective of the straightening device may be effected more readily by means of an element acting under constant, controlled pressure. The device, in the second embodiment shown in FIGS. 7 to 9, comprises a capless screw 7 having a central recess 8 which houses a coil spring 9, one end of which rests on the lower wall 10 of the recess 8, the other end of said spring being in contact with a flange 11 of a piston 12. The opening of the recess 8 is narrowed to guide the piston 12 in its sliding movements and to prevent it from separating from the screw 7 under the effect of slackening of the spring. As shown, the greater portion of the cylindrical body 13 of the piston 12 is disposed, in the expanded position of the spring 9 outside the body of screw 7.

Figure 3:
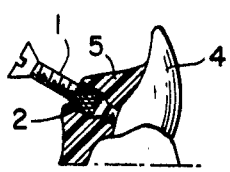
FIG. 3 is an elevation partly in section, showing a tooth to be straightened to which is applied the positioning or retaining screw and the nut shown in FIG. 2.
Figure 4:
FIG. 4 is an elevation of a modification of the screw shown in FIG. 1.
Figure 5:
FIG. 5 is a plan view of the screw shown in FIG. 4.
Figure 6:
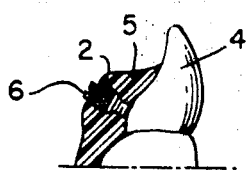
FIG. 6 is an elevation partly in section, of a tooth to be straightened to which is applied the screw shown in FIG. 4 and the nut shown in FIG. 1.

The piston screw 7 is placed on the tooth 4 (FIG. 9) to be straightened in the same position as the screw 6 previously described and shown in FIG. 3. Its function is to exert constant and adjustable pressure on the tooth to be moved and may advantageously be substituted for the capless screw 6 shown in FIG. 4.

Figure 10:
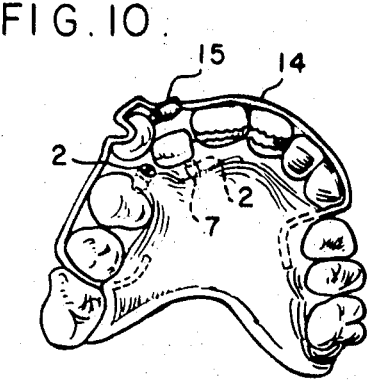
FIG. 10 and 11 are diagrammatic plan views of plaster models of teeth to be straightened, FIG. 10 showing a straightener device for upper teeth and FIG. 11 showing a straightener device for lower teeth.
Figure 11:
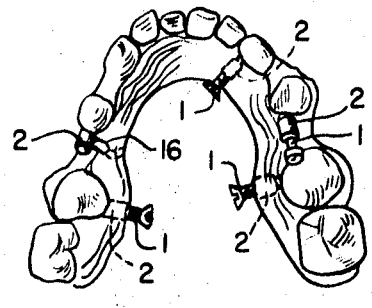

Depending upon the particular circumstances, it may be necessary to form the appliance with bent wire members anchored therein which are adapted to receive the nut and pressure screw. By way of example, FIG. 10 shows an appliance in position on a plaster model of a set of upper teeth. A labial arch 14 is anchored in the appliance and has a nut 15 with a smooth outer surface welded thereto. FIG. 11 shows an appliance for a set of lower teeth with a smooth surfaced nut 15 welded to a curved metallic spring wire 16 part of which is anchored in the appliance. The surface of nut 15 is smooth to minimize irritation to the patient's mouth.

I claim:

1. In a method of making a dental appliance for straightening teeth, said method including the steps of:

taking an impression of the patient's teeth with an impression compound;

casting the impression obtained with plaster to obtain a plaster model of the teeth;

removing the impression compound from the plaster model when the latter has hardened, the improvement comprising:

supporting a screw threadedly engaged in a threaded nut against a tooth to be straightened on the plaster model;

applying a resinous material to the plaster model so as to partially surround the teeth and embed the nut in said material;

curing the resinous material;

removing the screw from the nut embedded in the cured material;

separating the thus formed appliance from the plaster model; and threading a capless pressure screw into said nut for movement towards and away from the tooth to be straightened when the appliance is placed in position in the patient's mouth.

2. A dental appliance for straightening teeth comprising a member adapted to be retained in the mouth of the patient, said member including at least one threaded nut embedded therein and angularly positioned relative to the tooth to be straightened, a screw threaded into the nut so that the inner end of the screw will engage the proper area of the tooth to be straightened to exert the desired pressure thereon, the outer end of the screw being disposed so that it does not project beyond the inner surface of said member to obviate contact between the outer end of the said screw and the patient's tongue, whereby pressure can be selectively applied to a tooth by said screw by turning the screw relative to the nut to move the screw towards and away from a tooth to be straightened.

3. A dental appliance according to claim 2, wherein said nut has a tip of truncated-shape.

4. A dental appliance according to claim 3, wherein the outer surface of the nut is knurled.

5. A dental appliance according to claim 2, wherein said screw is capless.

6. A dental appliance according to claim 3, wherein the outer surface of the nut is smooth.

7. A dental appliance according to claim 5, wherein said capless screw includes a central recess having a narrowed opening at one end, a coil spring within said recess, a piston including a collar slidable within said recess, said collar being of greater diameter than said narrowed opening to prevent said piston from being ejected from said recess under tension of said spring.

8. A dental appliance according to claim 2, wherein said member is a plate of resinous material and includes a spring wire member one portion of which is embedded in said resinous material, another portion of which is disposed adjacent a tooth to be moved, said last mentioned portion supporting a nut having a smooth outer surface.